(12) United States Patent
Villa et al.

(10) Patent No.: US 12,135,238 B2
(45) Date of Patent: Nov. 5, 2024

(54) SYSTEM AND METHOD FOR DETECTION, LOCALIZATION AND SIGNALING OF SINGLE PHOTON EVENTS AND OF AT LEAST TWO PHOTONS TIME COINCIDENCE EVENTS

(71) Applicant: POLITECNICO DI MILANO, Milan (IT)

(72) Inventors: Federica Alberta Villa, Milan (IT); Franco Zappa, Milan (IT); Fabio Severini, Milan (IT); Francesca Madonini, Milan (IT); Danilo Bronzi, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 18/551,270

(22) PCT Filed: Mar. 18, 2022

(86) PCT No.: PCT/IB2022/052486
§ 371 (c)(1),
(2) Date: Sep. 19, 2023

(87) PCT Pub. No.: WO2022/195549
PCT Pub. Date: Sep. 22, 2022

(65) Prior Publication Data
US 2024/0175748 A1    May 30, 2024

(30) Foreign Application Priority Data
Mar. 19, 2021   (IT) .................. 102021000006728

(51) Int. Cl.
*G01J 1/44*    (2006.01)

(52) U.S. Cl.
CPC .......... *G01J 1/44* (2013.01); *G01J 2001/4466* (2013.01)

(58) Field of Classification Search
CPC .............. G01J 1/44; G01J 2001/4466; G01J 2001/442; G01J 2001/448; H04N 25/46; G01S 7/4863
See application file for complete search history.

(56) References Cited

U.S. PATENT DOCUMENTS

2016/0084703 A1* 3/2016 Shaber ................ G01T 1/248
                                                           250/336.1
2021/0382188 A1* 12/2021 Steadman Booker .... G01T 1/17

FOREIGN PATENT DOCUMENTS

WO        2014173644 A1    10/2014

OTHER PUBLICATIONS

International Search Report issued Jul. 21, 2022, in corresponding International Application No. PCT/IB2022/052486.

(Continued)

*Primary Examiner* — Thanh Luu
*Assistant Examiner* — Mai Thi Ngoc Tran
(74) *Attorney, Agent, or Firm* — Maier & Maier, PLLC

(57) ABSTRACT

A system and method for detection, localization and signaling of single photon events and of at least two photons time coincidence events. The system includes at least one array of pixels, each of which includes a photodetector and a front-end electronics, which outputs a digital signal; at least one event detection electronics including: a plurality of digital-to-analog transducers, one for each pixel of the array, configured to convert the digital signal coming from the respective pixel in a corresponding analog signal, which is quantized in amplitude and duration; an analog adder node configured to sum the analog signals coming from the digital-to-analog transducers, obtaining a sum analog signal;

(Continued)

and an overall analog-to-digital transducer. The system and method are ultimately configured to output a digital signal if an output signal of an analog adder node exceeds, respectively, a first threshold or the second threshold, allowing event detection, within a time window.

15 Claims, 7 Drawing Sheets

(56) References Cited

OTHER PUBLICATIONS

Frach, et al., "The Digital Silicon Photomultiplier—Principle of Operation and Intrinsic Detector Performance", 2009 IEEE Nuclear Science Symposium and Medical Imaging Conference Record, pp. 1959-1965, XP031826762, 7 pages.

Cristiano Niclass et al., "A CMOS 64X48 Single Photon Avalanche Diode Array with Event-Driven Readout", Solid-state Circuits Conference, Sep. 1, 2006, pp. 556-559, XP031046975, 4 pages.

\* cited by examiner

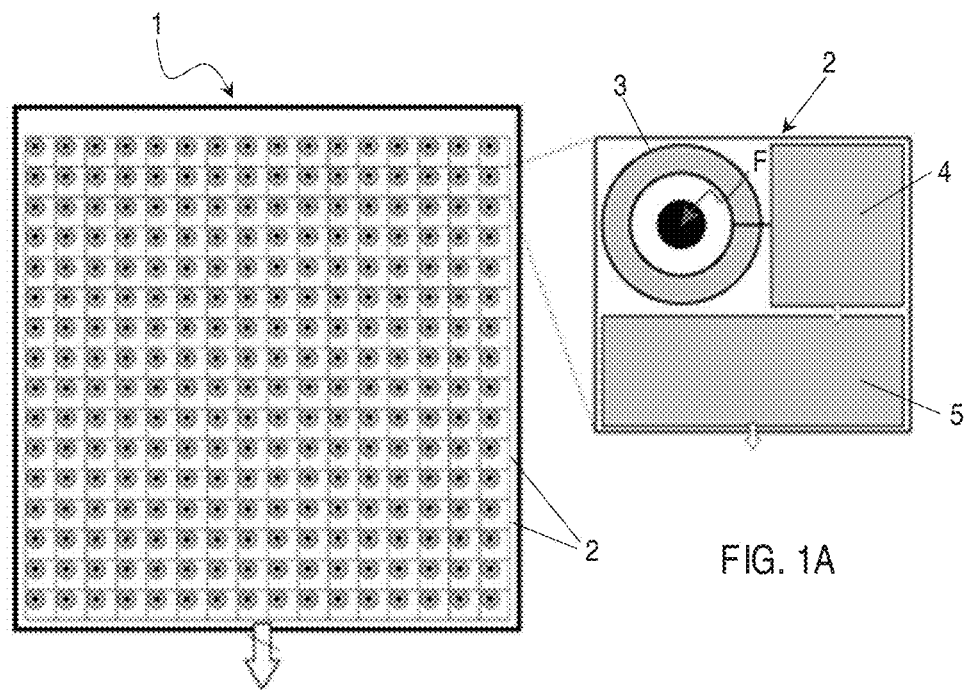
FIG. 1 (PRIOR ART)
FIG. 1A
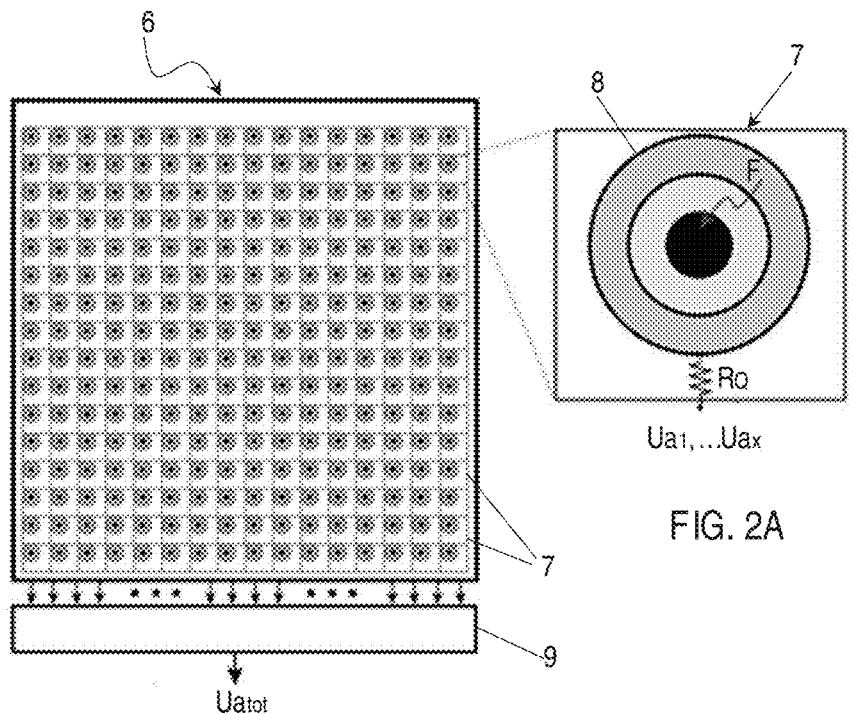
FIG. 2 (PRIOR ART)
FIG. 2A

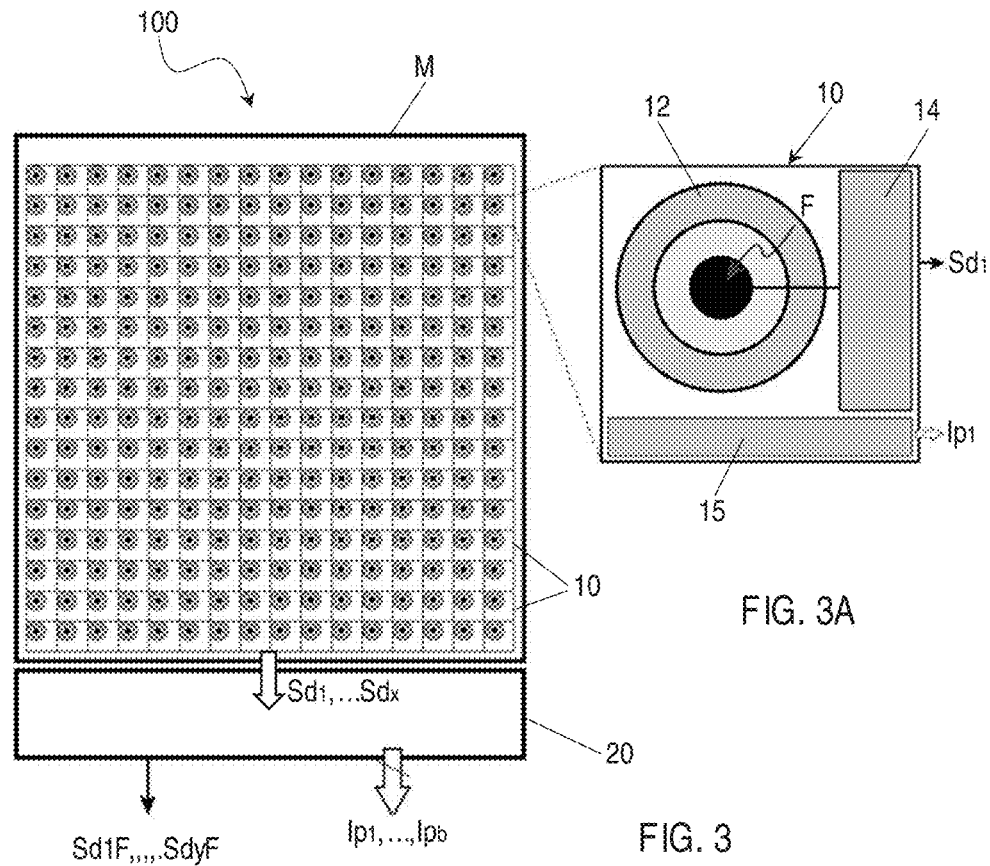
FIG. 3
FIG. 3A
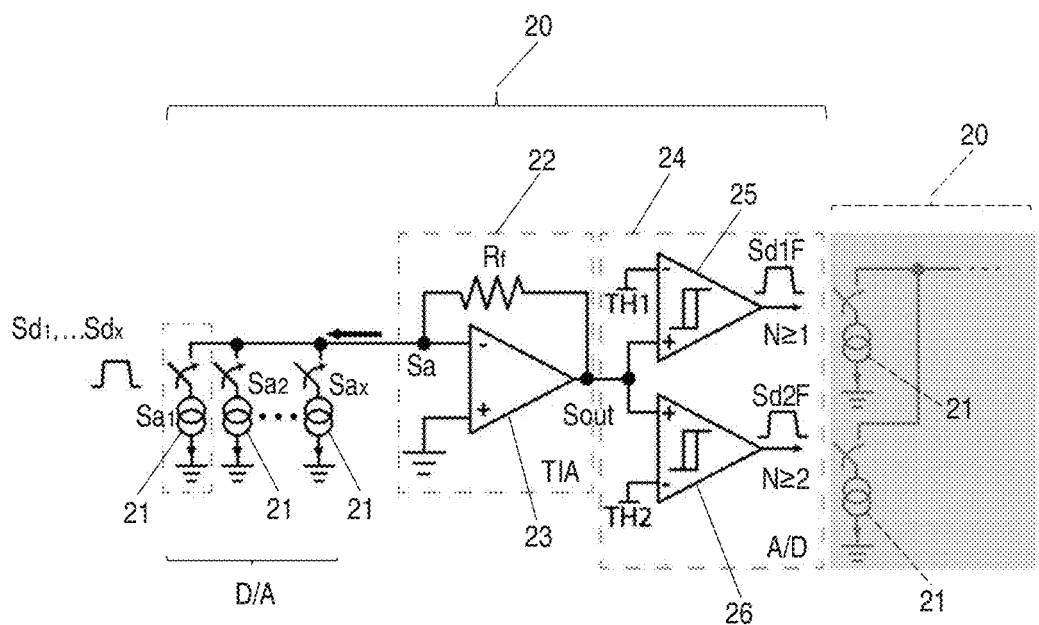
FIG. 4

SYSTEM AND METHOD FOR DETECTION, LOCALIZATION AND SIGNALING OF SINGLE PHOTON EVENTS AND OF AT LEAST TWO PHOTONS TIME COINCIDENCE EVENTS

TECHNICAL FIELD

The present invention relates to the technical field of photon detection systems. In particular, the present invention relates to a system and method for detection, localization and signaling of single photon events and at least two photons time coincidence events.

The present invention is particularly applicable, but not limited, to medical imaging, fluorescence imaging, spectroscopy, quantum microscopy, direct and indirect measurements of the time-of-flight (ToF) and object distance detection using light (LiDAR—Light Detection and Ranging or Laser Imaging Detection and Ranging), for example for application in self-driving vehicles, geodesy, altimetry and the like.

BACKGROUND

In recent years, the field of photodetection has undergone considerable progress, due to the growing demand in many scientific-technological sectors for devices capable of providing cutting-edge performance in photon detection.

When it is necessary to detect very weak light signals, it is known to use single-photon detectors, e.g. SPAD (Single-Photon Avalanche Diode) photodetectors, either single or organised as SPAD arrays, or SiPM (Silicon Photo Multiplier) photodetectors.

A SPAD photodetector essentially consists of a p-n junction, which is inversely polarised at a voltage higher than the avalanche voltage (breakdown). When a photon strikes on the SPAD, an electron-lacuna pair is generated, which triggers an avalanche process of multiplication of the electric charges very quickly (hundreds of ps), which outputs a macroscopic current signal (of the order of milliamperes). This operating regime is defined as Geiger mode. The time that elapses between the quiescence state of the SPAD and the triggering of an avalanche multiplication, which is coincident with the rising front of the current signal, stamps the time of arrival of the photon.

A SPAD photodetector therefore behaves like a photon-triggered sensor, which transduces a single photon into a macroscopic current of a myriad of electrons and gaps.

An array of SPAD photodetectors according to the prior art typically comprises a plurality of mutually independent pixels, each of which comprises a SPAD photodetector, a readout or front-end electronics (analog or digital) and, if applicable, an additional electronics configured to count the number of photons arriving on the SPAD or to perform the time stamping of their arrival time, for example, by measuring the time of flight of each photon, with respect to a reference synchronism.

The output of each pixel is processed completely digitally, preserving the advantage of SPAD photodetectors to be immune to readout noise and effectively providing information on the intensity (by means of photon counting) and/or on the waveform of the optical signal (by measuring the arrival time of the photons).

The array of SPAD photodetectors is typically read by means of a row-by-column scan of each pixel, which makes it possible to retain the spatial information (x, y), i.e. the position of the triggered pixel of the array, on which a photon has struck. For example, a counter in each pixel is read in a known order, which makes it possible to reconstruct the two-dimensional 2D intensity map, i.e. position (x, y) and number of photons detected, or the three-dimensional 3D map, i.e. position (x, y) and arrival time t of the photons detected or distance z of the object from the pixel of the array.

The output of an array of SPAD photodetectors is typically a digital bus, which provides the pixel content (number of detected photons or their arrival time, or other) at a given frame rate.

Despite their advantages in terms of immunity to readout noise and spatial resolution, i.e. the ability to store information on the position of the pixels of the array on which a photon has struck, SPAD arrays nevertheless have some drawbacks.

Firstly, as these arrays are completely digital, they are not able to detect phenomena of time coincidence or time correlation of the photons striking the array. This problem is typically solved by integrating, in each pixel of the array, a timing electronics, configured to time stamp the photons. The time stamps of the detected photons are then processed, so as to identify the pixels with the same time stamper of the detected photon.

As a result, each pixel of the SPAD array requires a rather complex timing electronics, which compromises the fill-factor of the array, i.e. the ratio of the active, photon-sensitive area of the SPADs to the overall area of the pixels. A post-processing step of the data is also necessary.

Secondly, the acquisition of fixed-frequency frames is disadvantageous in applications with low photon flux, since the system is overloaded with useless data, e.g. frames without evidence of incident photons, or frames with many pixels without useful data, with a negative impact on power consumption, the transmitted amount of data, the amount of data processed, and thus on the bandwidth of the readout channel, the availability of storage memory, the necessary retrieval and storage operations of the microprocessor, etc. In these types of applications, it is more convenient to use an event-driven readout approach, provided that the expected event can be detected directly on the chip (and not in post-processing). An event could be, for example, the detection of a photon in one pixel, or the simultaneous detection of two photons in two distinct pixels, or of N photons in N different pixels, etc.

SPAD arrays configured to detect single photon events, preserve spatial resolution and driven by events are described, for example, in: C. Niclass, M. Sergio and E. Charbon, "*A CMOS 64×48 Single Photon Avalanche Diode Array with Event-Driven Readout*" Proceedings of the 32nd European Solid-State Circuits Conference, pages 556-559, 2006; C. Niclass, M. Soga, H. Matsubara, S. Kato, and M. Kagami, "*A 100-m Range 10-Frame/s 340×96-Pixel Time-of-Flight Depth Sensor in 0.18-µm CMOS*" IEEE Journal Of Solid-State Circuits, vol. 48, no. 2, pages 559-572, 2013; and A. Berkovich, T. Datta and P. Abshire. "*A scalable 20×20 fully asynchronous SPAD-based imaging sensor with AER readout*" IEEE International Symposium on Circuits and Systems (ISCAS), 1110-1113, 2015.

A SiPM is an analog photodetector consisting of an array of microcells, which behaves like a single pixel. Each microcell includes a SPAD with a quenching resistor, connected between the output of the SPAD and a node common to the entire array. The quenching resistor makes it possible to stop the avalanche multiplication produced by the electron-lacuna pair that is generated when a photon strikes the microcell. In this way the microcell will quickly be able to detect a subsequent photon incident thereon.

The output signal of the SiPM is typically given by a single analog current, which is equal to the sum of the output analog current of each microcell, originated there from the detection of a photon, and is therefore a function of the number of photons incident on all the microcells of the SiPM.

The SiPM has the advantage both of providing a large active area, given by the sum of the active areas of all SPADs, and of being able to provide information on how many photons, separately or simultaneously, have driven different microcells, i.e. photon-number resolved. In fact, by measuring the amplitude of the output analog current, it is possible to know the number of photons striking the photodetector simultaneously (or nearly so).

A SiPM is therefore an event-driven detector, which provides an analog current only whenever one or more SPADs have been triggered, and is particularly suitable for detecting photon coincidences, i.e. when several photons hit several microcells at almost the same instant of time.

However, despite its many advantages, the SiPM has a number of drawbacks, mainly associated with its analog nature.

The SiPM is, in fact, subject to high readout noise. In addition, it is not possible to know which SPADs have been hit by photons, so that the spatial information (x, y) associated with the detected photons is lost; for this reason, the SiPM behaves as a single pixel. Furthermore, the SiPM is not easily scalable (i.e. extendable to an ever increasing number of microcells), because the common node would be overloaded with parasitic capacitances and leakage currents that would make it difficult to accurately determine the arrival time and the number of detected photons. In addition, as the size increases, propagation delays would be generated that would limit the ability to accurately detect the coincidences of a plurality of photons that are simultaneously incident on the photodetector.

For example, A. Muntean et al., "*A Fully Integrated State-of-the-Art Analog SiPM with on-chip Time Conversion*" IEEE Nuclear Science Symposium and Medical Imaging Conference Proceedings (NSS/MIC), pages 1-3, 2018, describes a scalable analog SiPM configured to discriminate single photon events.

For the readout noise to be eliminated or reduced, a digital SiPM is often used, in which, in each microcell instead of a quenching resistor, a digital front-end circuit is provided, which generates a digital signal every time an avalanche multiplication is triggered in the SPAD, while a control logic quenches the avalanche and reactivates the SPAD after a predetermined time. The digital output of each microcell is sent to a single digital node, typically an OR logic port, which generates a digital signal that is synchronous with the first detected photon.

Similarly to the analog SiPM, the digital SiPM behaves like a single pixel, which does not provide spatial information on which SPADs of the array were triggered by incident photons.

A digital SiPM configured to discriminate coincident events of photons within the entire array of microcells or macro-areas of microcells is described, for example, in T. Frach, G. Prescher, C. Degenhardt, R. de Gruyter, A. Schmitz and R. Ballizany, "*The digital silicon photomultiplier—Principle of operation and intrinsic detector performance*" IEEE Nuclear Science Symposium Conference Record (NSS/MIC), pages 1959-1965, 2009.

State-of-the-art SiPM arrays are also known, i.e. arrays in which each pixel consists of a SiPM, either analog or digital. Examples of such arrays are known from: M. Perenzoni, D. Perenzoni and D. Stoppa, "*A 64×64-Pixels Digital Silicon Photomultiplier Direct TOE Sensor With* 100-*MPhotons/s/ pixel Background Rejection and Imaging/Altimeter Mode With* 0.14% *Precision Up To* 6 *km for Spacecraft Navigation and Landing*" IEEE Journal of Solid-State Circuits, vol. 52, no. 1, pages 151-160, 2017; e A. Carimatto et al., "*Multipurpose, Fully Integrated* 128×128 *Event-Driven MD-SiPM With* 512 16-*Bit TDCs with* 45-*ps LSB and* 20-*ns Gating in* 40-*nm CMOS Technology*" IEEE Solid-State Circuits Letters, vol. 1, no. 12, pages 241-244, December 2018.

Patent EP 3 341 755 B1 describes a photon counting device, which is configured to record a simultaneous interaction of neighbouring pixels, if such interaction occurs within a very narrow coincidence window. The device is unable to detect interaction between pixels that are far apart and does not provide any spatial information.

Patent application EP 3 502 636 A1 describes a solution for counting and time stamping photons time coincidence events. This solution is very similar to a SiPM photodetector and does not provide the spatial information on multiple photons time coincidence events.

In an attempt to overcome the drawbacks of the analog-only or digital-only detectors described above, mixed analog-to-digital systems have been proposed.

Patent application US 2019/0259792 A1 describes a mixed analog-to-digital system for detecting two or more photons time coincidences in a SPAD array. This mixed system has a single common adder node, which drastically limits the number of pixels in the array and compromises overall reliability and noise immunity. In addition, all the pixels of the array behave as a single overall detector, analogous to a SiPM, and therefore no spatial information on incident photons is preserved.

SUMMARY

Aim of the present invention is to overcome the drawbacks of the prior art.

In particular, aim of the present invention is to present a system and method for detecting photons, configured to detect directly on-chip both single photon events and at least two photons time coincidence events within a predefined time window, while preserving immunity to noise.

An aim of the present invention is also to present a system and method for detecting photons, capable of optimising computational resources for processing detection signals, while minimising bottlenecks in data transmission, processing and storage.

An aim of the present invention is also to present a system and method for detecting photons, so that such system and method are configured to preserve the spatial resolution of the pixel array in the detection of photons, i.e., to provide the spatial information on where the photons were detected.

An aim of the present invention is also to present a system for detecting photons of a modular type, which allows the scalability of the system without compromising the performance thereof.

These and other purposes of the present invention are achieved by a system and method for detecting photons incorporating the features of the appended claims, which form an integral part of the present description.

According to a first aspect, the invention is directed to a system for detecting events of photons comprising at least one array of pixels, each pixel comprising a photodetector and a front-end electronics, which outputs a digital signal.

In addition, the detection system comprises at least one event detection electronics including:
- a plurality of digital-to-analog transducers, one for each pixel of the array, each digital-to-analog transducer being configured to convert the digital signal coming from the respective pixel in a corresponding analog signal, which is quantized in amplitude and duration;
- an analog adder node, to which the plurality of digital-to-analog transductors is operatively connected, the analog adder node being configured to sum the analog signals coming from the digital-to-analog transductors, thereby obtaining a sum analog signal; and
- an overall analog-to-digital transducer comprising at least one first comparator and a second comparator, which are operatively connected to the analog adder node, wherein the first comparator is configured to compare an output signal of the analog adder node with a first threshold corresponding to the triggering, within a time coincidence window, of a number of pixels greater than or equal to a first predetermined value, and
wherein the second comparator is configured to compare an output signal of the analog adder node with a second threshold corresponding to the triggering, within a time coincidence window, of a number of pixels greater than or equal to a second predetermined value,
wherein the first comparator and the second comparator are configured to output a digital signal if the output signal of the analog adder node exceeds, respectively, the first threshold or the second threshold, thereby allowing event detection, within the time coincidence window, with a number of photons incident on the array greater than or equal to the first or second predetermined value.

Thanks to this combination of characteristics, and in particular to the presence, in the system, of a digital and analog mixed processing chain of photon detections, a system for detecting photons is obtained which is capable of preserving the noise immunity typical of SPADs while providing on-chip localization and signaling of single photon events and multi-photons time coincidence events. In addition, as the readout is event-driven, the system transmits output data, e.g. to an external (off-chip) electronics, only when a single photon event or a two or more photons time coincidence event is detected, with consequent optimisation of the resources at system level, because the event occurrence signaling is driven and only useful data are signaled and transmitted to the off-chip electronics.

In one embodiment, the first threshold corresponds to the triggering of a number of pixels greater than or equal to one and the second threshold corresponds to the triggering of a number of pixels greater than or equal to two.

In one embodiment, the system comprises an output block, preferably a multiplexer, configured to generate a digital signal indicating the detection of an event, upon reaching a threshold of time coincident photons set by a user.

In one embodiment, each pixel of the array comprises an event-driven readout electronics configured to transmit, on a common address line, the addresses of the triggered pixels, upon generation of the event detection signal.

In one embodiment, the event-driven readout electronics of each pixel comprises a pixel state sampling block, an address writing block and a block for monitoring the common status of the address line, all blocks being in communication with an open-drain serial port with global pull-up resistor.

In one embodiment, a number of addresses is transmitted on the common address line, e.g. equal to or greater than the number of pixels triggered within the time window. This advantageously allow preserving the spatial resolution of the pixels within the array.

In one embodiment, the system comprises a mother array divided into arrays, wherein the event detection electronics of the arrays are connected to each other in seamless cascade, wherein the last event detection electronics of the cascade is connected to the output block. Additional stages of signal regeneration are advantageously avoided, and the scalability of the pixels and of the mother array is also ensured, thanks to a modular structure of the mother array.

In one embodiment, the cascade connection of the event detection electronics of the arrays follows a route having a H-tree fractal recursive branching.

In one embodiment, the analog adder node comprises a transimpedance amplifier.

In one embodiment, the photodetector of each pixel is a SPAD.

In accordance with a second aspect, the invention is also directed to a method for detecting photons comprising the steps of:
- generating at least one digital signal following the impact of a photon on one or more pixels of at least one pixel array;
- converting the digital signal coming from the respective triggered pixel in a corresponding analog signal which is quantized in amplitude and duration;
- summing the quantized analog signals in an analog adder node, thereby obtaining an analog sum signal;
- converting an output signal of the analog adder node into at least two digital signals, with a high logic value if the analog signal exceeds two threshold values, respectively;

wherein the analog-to-digital conversion step comprises at least the steps of:
- comparing the output signal of the analog adder node with a first threshold corresponding to the triggering, within a time coincidence window, of a number of pixels greater than or equal to a first predetermined value;
- comparing the output signal of the analog adder node with a second threshold corresponding to the triggering, within a time coincidence window, of a number of pixels greater than or equal to a second predetermined value; and
- generating a digital signal if the output signal of the analog adder node exceeds, respectively, the first threshold or the second threshold, thereby allowing event detection, within the time coincidence window, with a number of photons incident on the array greater than or equal to the first or second predetermined threshold value.

In one embodiment, the first threshold corresponds to the triggering of a number of pixels greater than or equal to one and the second threshold corresponds to the triggering of a number of pixels greater than or equal to two.

In one embodiment, the method comprises a preliminary step of selectively activating pixels of the array to make them sensitive to incident photons, the method further comprising a step of checking the exceeding of a threshold set by a user, and
if the threshold has not been exceeded, continuing to carry out the following steps of:
- generating at least one digital signal following the impact of a photon on one or more pixels of at least one pixel array;

converting the digital signal coming from the respective pixel in a corresponding analog signal which is quantized in amplitude and duration;

summing the analog signals in an analog adder node, thereby obtaining an analog sum signal; and converting an output signal of the analog adder node in at least two digital signals;

otherwise, if the threshold is exceeded, deactivating all pixels in the array until it is wished to activate them such that they are again sensitive to incident photons.

In one embodiment, the method further comprises a step of generating a digital signal indicating the detection of an event, upon reaching a time coincidence threshold of photons, set by a user.

In one embodiment, the method further comprises a step of transmitting, on a common address line, the addresses of the triggered pixels, upon generation of the event detection signal and while the pixels are deactivated.

In one embodiment, the method is applied to a mother array, which is divided into arrays, and comprises the following steps, carried out in parallel for all arrays into which the mother array is divided:

generating at least one digital signal following the impact of a photon on one or more pixels of at least one pixel array;

converting the digital signal coming from the respective pixel in a corresponding analog signal which is quantized in amplitude and duration;

summing the analog signals in an analog adder node, thereby obtaining an analog sum signal; and converting an output signal of the analog adder node in at least two digital signals;

wherein the at least two output digital signals of the array are transmitted to a subsequent array, until the mother array is completed, according to a seamless cascade configuration; and wherein the at least one digital output signal at high logic value of the mother array is transmitted to an output block, which generates an event digital signal upon reaching a threshold of time coincidence photons, set by a user.

Further features and advantages of the present invention will be more evident from the description of the accompanying drawings.

BRIEF DESCRIPTION OF THE DRAWINGS

The invention is described hereinbelow with reference to certain examples provided by way of non-limiting example and illustrated in the accompanying drawings.

These drawings illustrate different aspects and embodiments of the present invention and reference numerals illustrating structures, components, materials and/or similar elements in different drawings are indicated by similar reference numerals, where appropriate.

FIGS. 1 and 1A schematically show, respectively, an array of fully digital SPAD photodetectors according to the prior art and, in detail, the configuration of each pixel of the array.

FIGS. 2 and 2A schematically show, respectively, a fully analog SiPM photodetector according to the prior art and, in detail, the configuration of each microcell of the array.

FIGS. 3 and 3A schematically show, respectively, a system for detecting events of photons according to the present invention and, in detail, the configuration of each pixel of the array.

FIG. 4 shows a circuit diagram of a possible embodiment of the event electronics for detecting events of the system of FIG. 3.

DETAILED DESCRIPTION OF THE EMBODIMENTS

Figure 5:
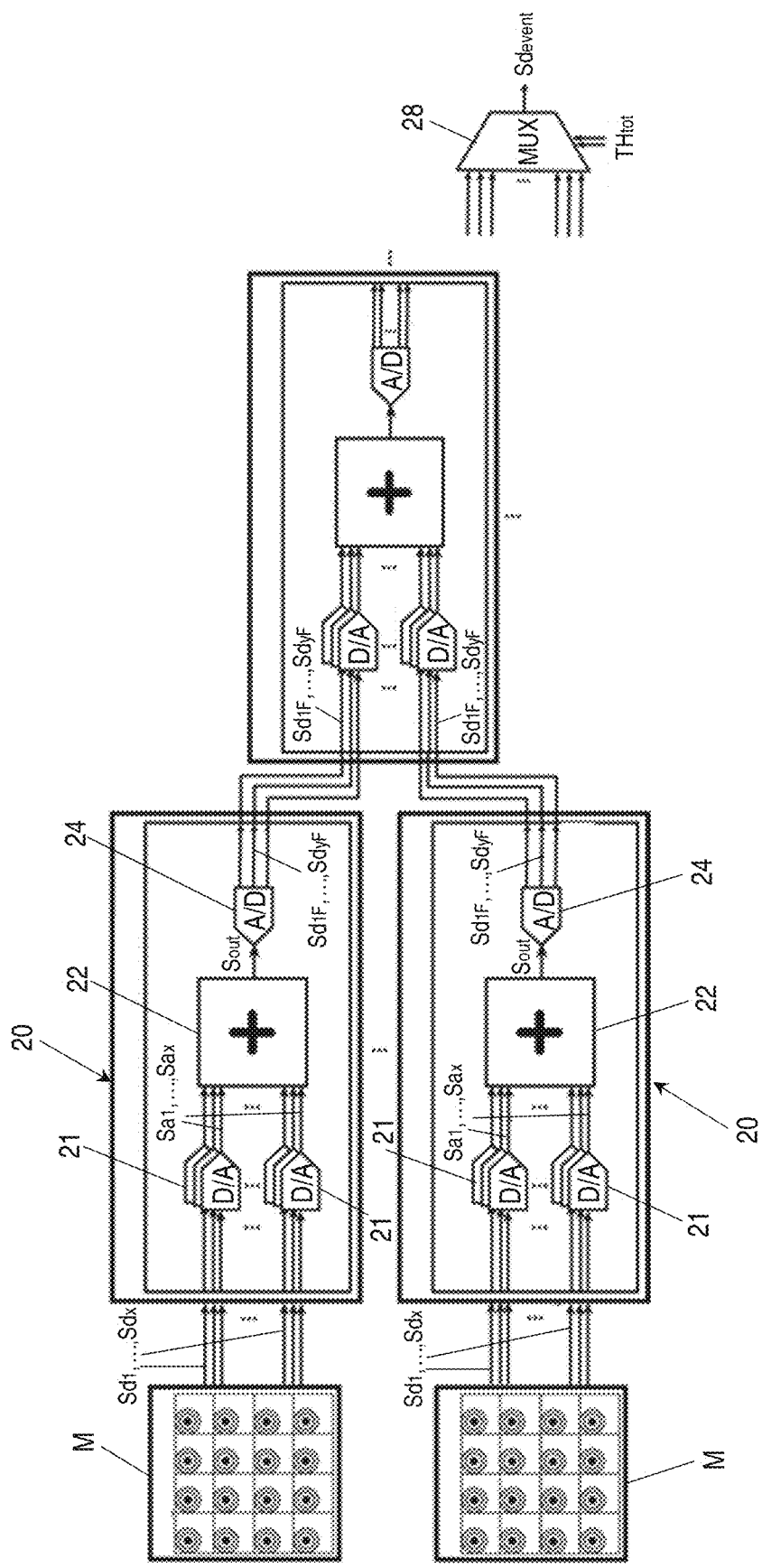
FIG. 5 shows a schematic representation of a modular division of the system into arrays and the repetition of the event detection electronics up to the level of the mother array, according to the present invention.

While the invention is susceptible to various modifications and alternative constructions, some embodiments provided for explanatory purposes are described in detail below.

It must in any case be understood that there is no intention to limit the invention to the specific embodiment illustrated, but, on the contrary, the invention intends covering all the modifications, alternative and equivalent constructions that fall within the scope of the invention as defined in the claims.

In the following description, therefore, the use of "e.g.", "etc.", "or" indicates non-exclusive alternatives without limitation, unless otherwise indicated; the use of "also" means "including, but not limited to" unless otherwise indicated; the use of "includes/comprises" means "includes/comprises, but not limited to" unless otherwise indicated.

With reference to FIG. 1, an array of SPAD photodetectors according to the prior art is illustrated therein.

The array, denoted by reference numeral 1, comprises a number of mutually independent pixels 2. Each pixel 2 comprises a SPAD photodetector 3, a front-end electronics 4 and processing electronics, consisting for example of a time-to-digital (TDC) converter 5 configured to measure the arrival time of the photon F on a respective SPAD 3.

As described above, when a photon F impacts on a SPAD, an electron-lacuna pair is created, which triggers an avalanche multiplication of electrical charges, leading to the generation of a macroscopic current, which is converted by the front-end electronics 4 into a digital signal. Each pixel 2 therefore produces a digital output $Ud_1 \ldots Ud_b$ (where b indicates the number of bits of the digital output), indicating the arrival time of the photon F on the SPAD 3 and the digital outputs $Ud_1 \ldots Ud_b$ are transmitted to a bus located at the output of the array 1.

FIG. 2 instead shows a SiPM photodetector according to the prior art.

The SiPM photodetector, generally referred to by reference numeral 6, comprises an array of microcells 7. Each microcell 7 includes a SPAD photodetector 8, entirely similar to the SPAD 3 described above with reference to array 1, in series with a quenching resistor $R_Q$, whose function is, as described above, to stop the avalanche multiplication produced by the electron-lacuna pair, which is generated when a photon strikes on the SPAD 8 of the microcell 7 and thus to allow the microcell 7 to detect a new incident photon. In particular, the quenching resistor $R_Q$ is connected between each SPAD 8 and a common node 9, which acts as a single shared adder node for all SPADs 8. The output of the SiPM 6 is therefore the analog sum $Ua_{tot}$ of the output analog currents $Ua_1, \ldots, Ua_x$ of all the microcells 7 which have been hit by a photon F.

With reference to FIG. 3, it is shown therein a system for detecting events of photons according to a preferred embodiment of the present invention.

The system, generally referred to by reference numeral 100, comprises an array M of pixels 10, each of which includes a photodetector 12, preferably a SPAD, a front-end electronics 14 and an event-driven readout electronics 15, configured to provide information on the spatial position of the photon-triggered pixels of the array, as will be described in greater detail below.

In the following, reference will be made to SPAD photodetectors, but it is understood that what is described also applies to photodetectors of a different type, as long as they are suitable for the purpose. For example, as an alternative to SPADs, analog photodetectors (also known as linear detectors) could be used, after digitising the output information.

Figure 8:
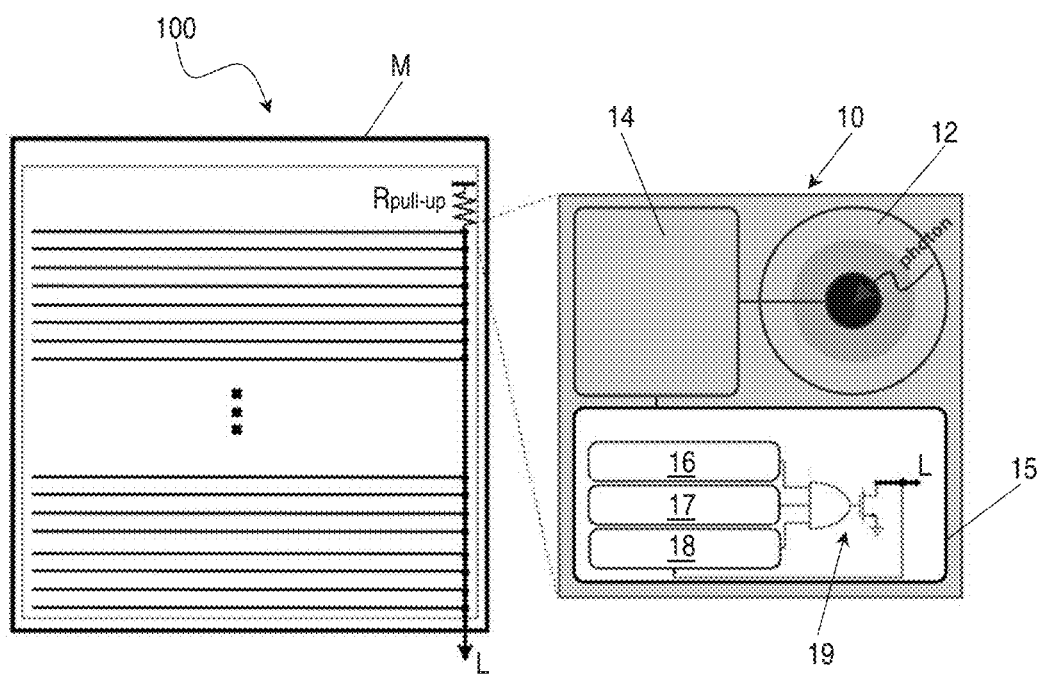
FIG. 8 schematically shows an event-driven read-out electronics according to the present invention.

Each pixel 10, whose SPAD 12 is hit by a photon F, outputs a digital signal $Sd_1, \ldots, Sd_x$ (where x indicates the number of SPADs present in the array M), synchronous with the activation of the respective SPAD 12, and the address $Ip_1, \ldots Ip_b$ (where b indicates the number of bits of the address) of the hit pixel 10, said address being transmitted to an address line L (see FIG. 8).

As will be described in detail below, the output of the system 100 is a number of digital signals, of detection of a single photon event and of two or more photons time coincidence and, preferably an address line L, which provides the addresses of the triggered pixels within a predefined time window preferably of the order of a few nanoseconds.

The system 100 also includes an event detection electronics 20, which, as will be described in detail below, is configured to detect on-chip single photon events and two or more photons time coincidence events distributed over the entire array M within the time coincidence window. The number of time coincident photons to be detected by the system 100 is set by the user from time to time.

The event detection electronics 20 constitutes, in essence, a detector node, shared between the pixels 10 of the array M, which identifies when a photon F—single photon event—or more photons F—multi-photons time coincidence event— have driven, respectively, one or more SPADs 12, with consequent generation of a respective output digital signal $Sd_1, \ldots, Sd_x$ of the respective pixel 10.

The triggered SPADs 12 can be anywhere within the array M, whereby the detection of the photons F time coincidence events occurs indiscriminately over the entire array M and is therefore not limited to neighbouring pixels 10, portions of the array M or any possible grouping of pixels 10.

As shown in detail in FIG. 4, the event detection electronics 20 comprise a plurality of digital-to-analog (D/A) transducers 21, one for each pixel 10 of the array M, connected to each other in parallel, an analog adder node 22, to which the plurality of digital-to-analog transducers 21 is operatively connected, and an overall analog-to-digital (A/D) transducer 24, operatively connected to the analog adder node 22.

The output digital signals $Sd_1, \ldots, Sd_x$ of the digital front-end electronics 14 of the pixels 10, whose SPAD 12 has been hit by a photon F, are provided as input to a respective digital-to-analog transducer 21, for example a voltage-controlled current generator (i.e., a MOS transistor), of the plurality of digital-to-analog transducers 21, which outputs a respective quantized analog signal $Sa_1, \ldots, Sa_x$.

Unlike a SiPM photodetector of known type, described above with reference to FIG. 2, the quantized analog signals $Sa_1, \ldots, Sa_x$ are not the currents generated by the SPADs 12, but rather well-defined signals with adjustable duration and amplitude. This advantageously allows the signal amplitude to be set well above the electronic noise limit, thus preserving the immunity to readout noise typical of the arrays of SPAD photodetector, described above with reference to FIG. 1.

The quantized output analog signals $Sa_1, \ldots, Sa_x$ of the digital-to-analog transducers 21 are provided as input to the analog adder node 22, preferably having the form of a transimpedance amplifier (TIA), which comprises an operational amplifier 23 with a feedback resistor Rf. In particular, the single quantized analog signals $Sa_1, \ldots, Sa_x$ coming from the digital-to-analog transducers 21 are summed in the analog adder node 22, generating an analog sum signal Sa, which is also quantized.

The duration of the coincidence window coincides with the (programmable) duration of the signals $Sd_1, \ldots, Sd_x$, and consequently of $Sa_1, \ldots, Sa_x$, and is preferably of the order of a few nanoseconds. Only photons detected simultaneously within the coincidence window will result in signals $Sa_1, \ldots, Sa_x$ which summing up in Sa can be detected as multi-photons time coincidence events.

Once the duration of the digital signals $Sd_1, \ldots, Sd_x$, and consequently also the quantized analog signals $Sa_1, \ldots, Sa_x$, and correspondingly the duration of the time coincidence window have been adjusted, depending on the amplitude of the analog sum signal Sa in the analog adder node 22, it is possible to distinguish the number of pixels 10 that have been triggered simultaneously within the time coincidence window.

For this purpose, the analog sum signal Sa is converted by the transimpedance amplifier TIA into an output analog signal Sout, which is input to the overall analog-to-digital transducer 24.

In particular, the overall analog-to-digital transducer 24 comprises a first comparator 25 and a second comparator 26, configured to discriminate the number of photons events, as a function of the amplitude of the analog sum signal Sa, and thus within the corresponding time coincidence window.

More particularly, the first comparator 25 has a first threshold $TH_1$, corresponding to the coincident triggering of a number N of pixels 10 greater than or equal to a first value, in the illustrated example $N \geq 1$, while the second comparator 26 has a second threshold $TH_2$, corresponding to the coincident triggering of a number N of pixels greater than or equal to a second predetermined value, in the illustrated example $N \geq 2$.

The output analog signal Sout of the analog adder node 22 is compared, in the first comparator 25 and in the second comparator 26, respectively, with the first threshold $TH_1$ and the second threshold $TH_2$.

It follows that: if Sout>$TH_1$, i.e. if the output analog signal Sout of the transimpedance amplifier TIA exceeds the first threshold $TH_1$, corresponding to the coincident triggering of a number of pixels 10 greater than or equal to one, then the first comparator 25 outputs a digital signal $Sd_{1F}$, indicative of an at least one photon event within the time coincidence window; if also Sout>$TH_2$, i.e., if the output analog signal Sout of the transimpedance amplifier TIA exceeds also the second threshold $TH_2$, corresponding to the coincident triggering of a number of pixels 10 greater than or equal to two, then the second comparator 26 outputs a high logic value digital signal $Sd_{2F}$, indicative of a at least two photons time coincidence event within the time coincidence window.

In other words, when the output analog signal Sout exceeds the first threshold $TH_1$, but not the threshold $TH_2$, only one digital signal $Sd_{1F}$ is generated, indicative of a single photon event, whereas when the output analog signal Sout exceeds both the first threshold $TH_1$ and the second threshold $TH_2$, two signals $Sd_{1F}$, $Sd_{2F}$ are generated, having the same duration of the digital signals $Sd_1$, . . . , $Sd_x$ generated by the pixels 10, indicative of a at least two photons coincidence event. The output digital signal of the system 100 is a digital event signal $Sd_{event}$ set by the user and corresponding to the exceeding of the first threshold $TH_1$ (detection of an at least one photon event) or the second threshold $TH_2$ (detection of an at least two photons time coincidence event), which is produced by an output block 28 (see FIG. 7).

Although two comparators are described in the illustrated embodiment, an event detection electronics 20 comprising a number of comparators greater than two, each with a threshold value increasing up to $TH_n$, where n is the number of coincident photons it is wished to detect (in a possible embodiment the thresholds comprise all values between 1 and n), falls within the scope of protection of the present invention. Also in this case, the output digital signal of the system 100 will be the one corresponding to the exceeding of the threshold set by the user. Naturally, this leads to a greater occupation of the non-active area of the array M and an increase in energy consumption.

Figure 6:
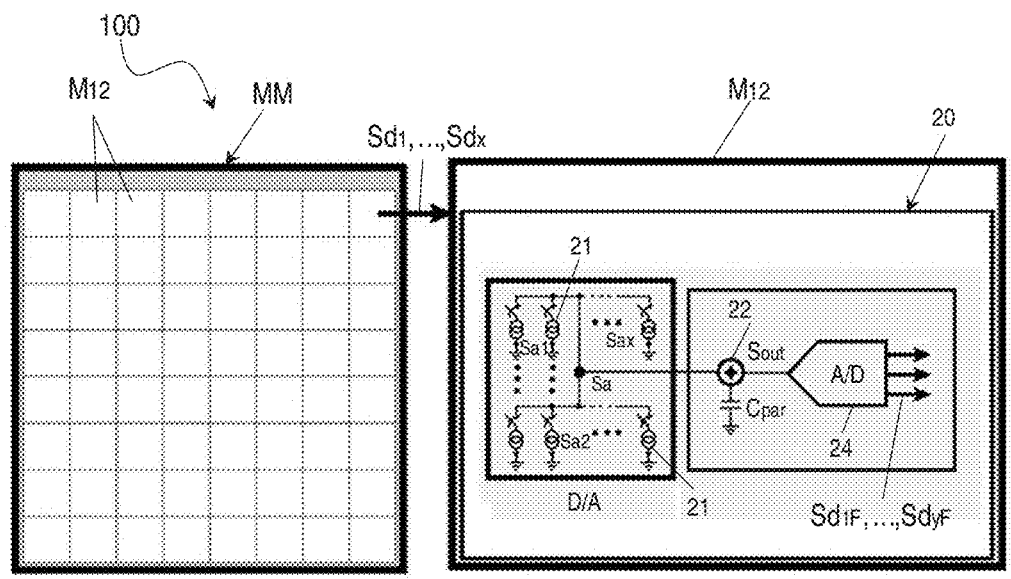
FIG. 6 shows a schematic representation of a possible modular structure of the system for detecting events of photons according to the present invention, together with a circuit diagram of a base block or array.
Figure 7:
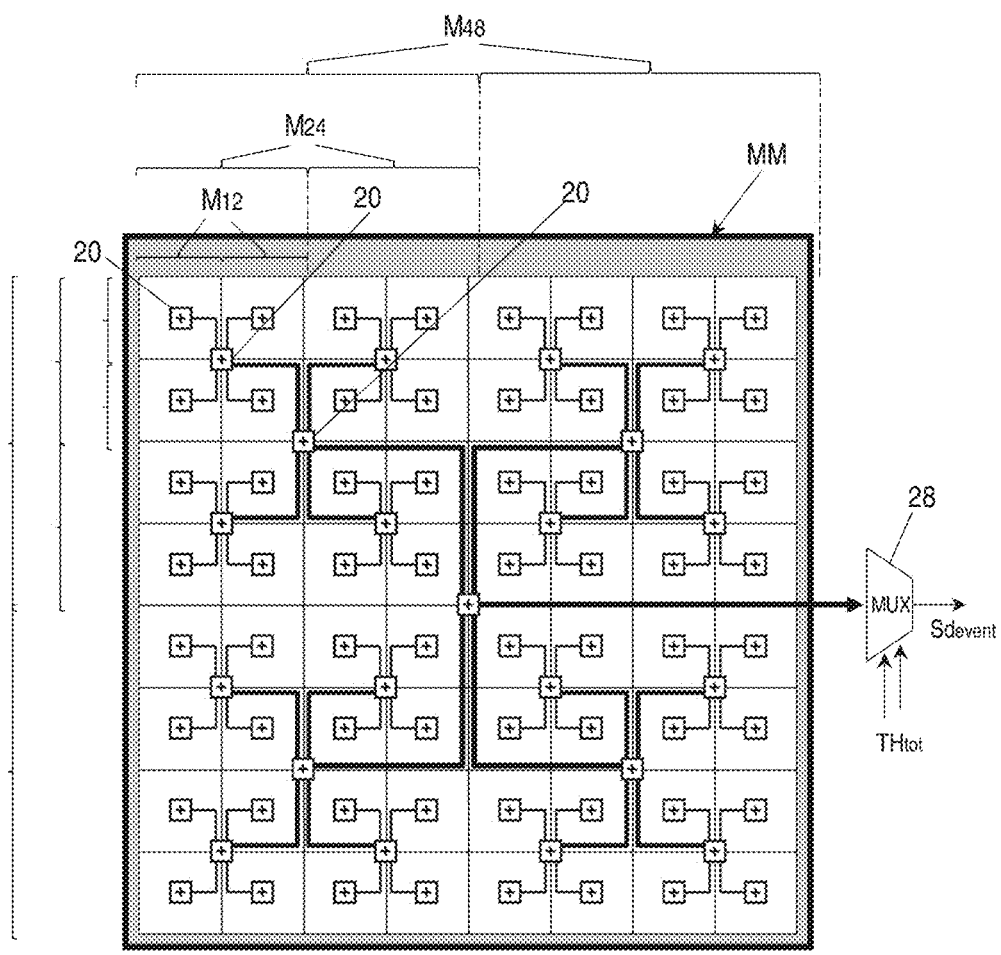
FIG. 7 shows a schematic representation of routing with H-tree fractal recursive branching of the event-detection electronics of the modular array division of the system for detecting photon events FIG. 5.

FIGS. 5 to 7 illustrate a system 100 for detecting photon events, which has a modular and scalable structure. The system 100 comprises, in such a case, a mother array MM, divided into a plurality of arrays M, each provided with its own event detection electronics 20, the event detection electronics 20 being connected to each other in seamless cascade.

More particularly, and with reference to FIG. 5, the arrays M of the mother array MM generate corresponding digital signals $Sd_1$, . . . , $Sd_x$, which are transmitted as input to the respective event detection electronics 20. Within each event detection electronics 20, the digital signals $Sd_1$, . . . , $Sd_x$ are transformed, by the digital-to-analog transducers 21, into corresponding analog signals $Sa_1$, . . . $Sa_x$, which are summed, in the respective analog adder node 22. The output analog signal $S_{out}$ of each analog adder node 22 is transmitted as input to a respective overall analog-to-digital transducer 24, which outputs a number of digital signals $Sd_{1F}$, . . . , $Sd_{yF}$ (where y indicates the number of output signals generated), each corresponding to exceeding the threshold of a respective comparator of the overall analog-to-digital transducer 24. In order for the threshold to be exceeded, the triggerings must be coincident, i.e. they must occur within the time window set by the user, the duration of which coincides with the duration of the digital signals $Sd_1$, . . . , $Sd_x$ and consequently also of the analog signals $Sa_1$, . . . , $Sa_x$.

The output digital signals $Sd_{1F}$, . . . , $Sd_{yF}$ of each event detection electronics 20 are then transmitted as input to another event detection electronics 20 and so on, in cascade, until completion of the mother array MM.

At the end of the cascade of event detection electronics 20, the output block 28 generates a digital event signal $Sd_{event}$ at the occurrence of an event, understood as reaching at least $TH_{tot}$ coincident photons in the whole mother array MM, where $TH_{tot}$ is the threshold corresponding to the number of time coincident photons set by the user. The output block may, for example, be implemented by means of a multiplexer 28, which selects the correct output signal of the last event detection electronics 20 of the cascade. By way of example, the output signal $Sd_{event}$ of the multiplexer 28 may be the signal corresponding to the exceeding of the first threshold $TH_1$ (detection of an at least one photon event) or the signal corresponding to the exceeding of the second threshold $TH_2$ (detection of an event of at least two time coincident photons).

A particularly preferred embodiment of a modular and scalable system 100 is shown in FIGS. 6 and 7.

The system 100 comprises a 96×96-pixel mother array MM, preferably made in CMOS technology. The number of pixels 10 of the mother array MM was chosen so as to have the highest number of SPAD 12, while ensuring good performance of the electronics of the system 100. Of course, the following description of the 96×96-pixel mother array MM also applies to differently sized mother arrays.

The mother array MM was then divided into 12×12-pixel arrays $M_{12}$. The pixels 10 of each array $M_{12}$ are connected to a respective event detection electronics 20 of the type described above and illustrated with reference to FIG. 4.

The event electronics 20 of each array $M_{12}$ thus comprise a plurality of digital-to-analog transducers 21, one for each pixel 10 of the array $M_{12}$, an analog adder node 22, common to all pixels 10 of the array $M_{12}$, and an overall analog-to-digital transducer 24, operatively connected to the analog adder node 22. Of course, the mother array MM can be divided into arrays M having a different number of pixels.

As set forth above, the event detection electronics 20 of each array $M_{12}$ of the mother array MM is capable of transforming the output digital signals $Sd_1$, . . . , $Sd_x$ of the pixels 10 hit by photons into corresponding analog signals which are quantized in amplitude and intensity $Sa_1$, . . . , $Sa_x$ (the duration of which determines the duration of the time coincidence window) through the respective digital-to-analog transducers 21. The quantized analog signals $Sa_1$, . . . , $Sa_x$ are then summed in the analog adder node 22, resulting in an analog sum signal Sa. The analog sum signal Sa is subsequently converted into an output analog signal $S_{out}$.

Finally, the last analog-to-digital conversion is carried out in the overall analog-to-digital transducer 24, so as to generate a number of high logic value digital signals $Sd_{1F}$, . . . , $Sd_{yF}$ corresponding to the exceeding, within the time coincidence window, of the respective threshold values of one, two, . . . n comparators of the analog-to-digital transducer 24.

In order to sum all the quantized analog signals $Sa_1$, . . . , $Sa_x$ in the analog adder node 22, the digital-to-analog transducers 21 (which can be implemented, for example, with voltage-controlled current generators) are connected in parallel, therefore generating a signal proportional to the number of generators connected to each other.

Moreover, the size of the arrays $M_{12}$ is chosen to ensure a parasitic capacitance $C_{par}$ at the adder node 22 small enough to allow fast electronic processing and fast rise/fall fronts of the analog sum signal Sa and of the output analog signal $S_{out}$. In this way, the timing information, i.e. the duration of the time coincidence window and the instant at which thresholds of the analog-to-digital converter 24 are exceeded, is not compromised.

As mentioned above, the arrays that make up the mother array MM can be connected to each other in such a way that the respective event detection electronics 20 are operatively connected according to a seamless cascade configuration.

By way of non-limiting example, and as shown in FIG. 7, again with reference to the 96×96-pixel mother array MM divided into the 12×12-pixel arrays $M_{12}$ described above, the digital signals $Sd_{1F}, \ldots, Sd_{yF}$ coming from four 12×12-pixel arrays $M_{12}$ may be summed in an analog adder node 22 of an event detection electronics 20 of a 24×24-pixel array $M_{24}$ resulting from the sum of the four 12×12-pixel arrays $M_{12}$.

In a completely analogous manner, the digital signals $Sd_{1F}, \ldots, Sd_{yF}$ coming from four arrays $M_{24}$ may be summed in an analog adder node 22 of an event detection electronics 20 of a 48×48 pixel array $M_{48}$ resulting from the sum of the four 24×24-pixel arrays $M_{24}$, and so on up to the electronics 20 located in the centre of the mother array MM of FIG. 7 for the detection of events of the mother array MM.

Finally, the event detection electronics 20 of the array mother MM is operatively connected to the multiplexer 28, which outputs the digital event signal $Sd_{event}$ at the detection of a number of coincident photons within the time window equal to the threshold $TH_{tot}$ set by the user, for example chosen among $TH_1, TH_2, \ldots TH_n$.

The choice of these numbers of pixels is the result of a compromise between the problems of leakage currents and parasitic capacitance in the array M, in the example shown the array $M_{12}$, and the overall number of stages of digital-to-analog and analog-to-digital cascade conversions, resulting in a delay between event and generation of the corresponding output signal $Sd_{event}$, which is a function of the number of stages.

In particular, in order to minimise discrepancies and delays in the propagation of the signals between the arrays M of the mother array MM of the system 100, a routing having a H-tree fractal recursive branching was carried out for seamless cascade connection between the event detection electronics 20 of the arrays M.

Such H-tree fractal recursive branching is clearly visible in FIG. 7, wherein the event detection electronics 20 of each 12×12-pixel array $M_{12}$ is placed in the centre of the 12×12-pixel array $M_{12}$ and, similarly, the event detection electronics 20 of each 24×24-pixel array $M_{24}$ is placed in the centre of the 24×24-pixel array $M_{24}$ and the event detection electronics 20 of each 48×48-pixel array $M_{48}$ is placed in the centre of each 48×48-pixel array $M_{48}$, and so on.

In this way, all the paths connecting each event detection electronics 20 to the subsequent one can advantageously be identical and not affected by dissimilar time delays (skew). The H-tree shape in fact equalises the paths from the output of each overall analog-to-digital transducer 24 (whatever its position) to the input of the digital-to-analog transducers 21 of the electronics 20 for the detection of cascade events.

The signals travelling along the branches of the H-tree are the output digital signals of the comparators of the overall analog-to-digital transducer 24. This makes it possible, advantageously, to propagate over long paths (resistive and capacitive) only digital signals, which are more immune to electronic noise.

When the event detection electronics 20 of the array M—or the cascade of event detection electronics 20 of the arrays M into which the mother array MM is divided, in the case of a system 100 with a modular and scalable structure—detects an at least one photon event or a two or more photons time coincidence event, only the pixels 10 hit by the photons F communicate their address. This advantageously allows only the spatial coordinates of the triggered pixels to be provided, without wasting resources on unnecessary data.

To this end, and as shown in detail in FIG. 8, all the pixels 10 of the array M—or of arrays M into which the mother array MM is divided in the case of a system 100 with a modular and scalable structure—are connected to a shared address line L.

By way of a non-limiting example, the communication of the pixels 10 on the address line L can be based on a "zero-win" serial communication protocol, similar to the CAN (Controller Area Network) or I²C (Inter Integrated Circuit) serial bus communication protocols. In particular, the triggered pixel 10 with the lowest address is the first to take control over the address line L and outputs its address. The other triggered pixels 10 are queued to subsequently take control over the address line L one after the other.

The read-out electronics 15 of each pixel 10 comprise three main blocks, namely a pixel state sampling block 16, an address writing block 17 and a block 18 for monitoring the status of the address line L, all in communication with an open-drain (or open-collector) serial port 19 with a global $R_{pull-up}$ resistor. The open-drain solution means that, when one of the pixels 10 sends its output into conduction, it forces the address line L to a low level (logic level zero); when the output is deactivated, the address line L is brought back to a high level (logic level one) by the global pull-up resistor $R_{pull-up}$.

The sampling block 16 preferably comprises a sampler with a 1-bit register and is configured to sample the state of the pixel 10, i.e. whether the pixel 10 is triggered or not.

The writing block 17 preferably comprises a shift register, for example, a 10-bit one and is configured to serially write the address $Ip_1, \ldots, Ip_b$ of the pixel 10 triggered on the address line L.

The monitoring block 18 is preferably constituted by a finite state machine, which monitors the state of the address line L and, if the address line L is busy writing the address $Ip_1, \ldots, Ip_b$ of another triggered pixel 10, the writing is interrupted and repeated in the subsequent data transfer.

In particular, each pixel 10 activates the open-drain serial port 19 when it has to communicate a bit equal to 0 of its address, if instead it has to communicate a bit equal to 1, it leaves the open-drain serial port 19 inactive, so that the global pull-up resistor $R_{pull-up}$ brings the address line L to 1. If, while a pixel 10 is communicating a 1, another pixel 10 communicates a 0 (activating its open-drain serial port 19) the first pixel, i.e. the one that was communicating 1, realises that the address line L has been brought to 0 by another pixel 10 and therefore stops communicating its address. Consequently, the second pixel 10, i.e. the one that communicated 0, takes over the address line L by itself, without its address being altered in any way by the first pixel 10.

For reading purposes, in the case of a modular and scalable system 100, the choice of dividing a mother array MM into arrays M (e.g. 24×24-pixel arrays, not necessarily coincident with the size of the arrays M defined for event detection purposes) makes it possible, advantageously, to set the shared data line to logic level 1 or to logic level 0, in a time that allows the address to be communicated at a certain clock frequency, while using small transistors.

The system 100 according to the invention is configured to communicate a number n+1 of addresses, i.e. a number of addresses equal to the number n of coincidence photons F within the time window, which the user wishes to detect, increased by 1, so that it can identify in post-processing whether the event is a coincidence event of exactly n photons (in which case there will only be n valid addresses) or more than n photons (in which case there will be n+1 valid addresses).

For example, if the user wishes to know the time coincidence of two photons, the system will communicate three addresses on the address line L. In fact, although for detecting the position of a pair of time coincident photons F, and given the low rate of coincident photons, in principle two addresses $Ip_1, \ldots, Ip_b$ would be sufficient, given the possible high rate of spurious photons, e.g. coming from ambient light or from events triggered without incident light (thus due to the intrinsic noise of the photodetector), it is preferable to have more than two addresses, e.g. three addresses. This is to check whether a spurious event has invalidated the measurement. In other words, the measurement is only valid if the third address corresponds to a value that cannot be assumed by any pixel address (i.e. it is not a valid address), which means that no spurious third event has occurred within the time coincidence window.

Considering a reference clock of 100 MHz, the transfer of address data from the array M—or from each array M into which the mother array MM is divided in the case of a modular and scalable system 100—to a final memory bank from which the data are read requires about 330 ns (considering 10-bit addresses). This is the so-called "dead time" because, during this period of time, the array M, or the arrays of a mother array MM, are inactive. In other words, all SPADs 12 of the pixels 10 are deactivated and are unable to detect any new incoming photons F. This is a significant improvement over the "dead time" for reading an array with the standard approach, which consists of communicating the status of each pixel (using a single bit: 1 activated, 0 not activated). By way of example, for a 96×96-pixel array $M_{96}$ and a reference clock of 100 MHz, scanning the entire array would take 92600 ns.

Figure 9:
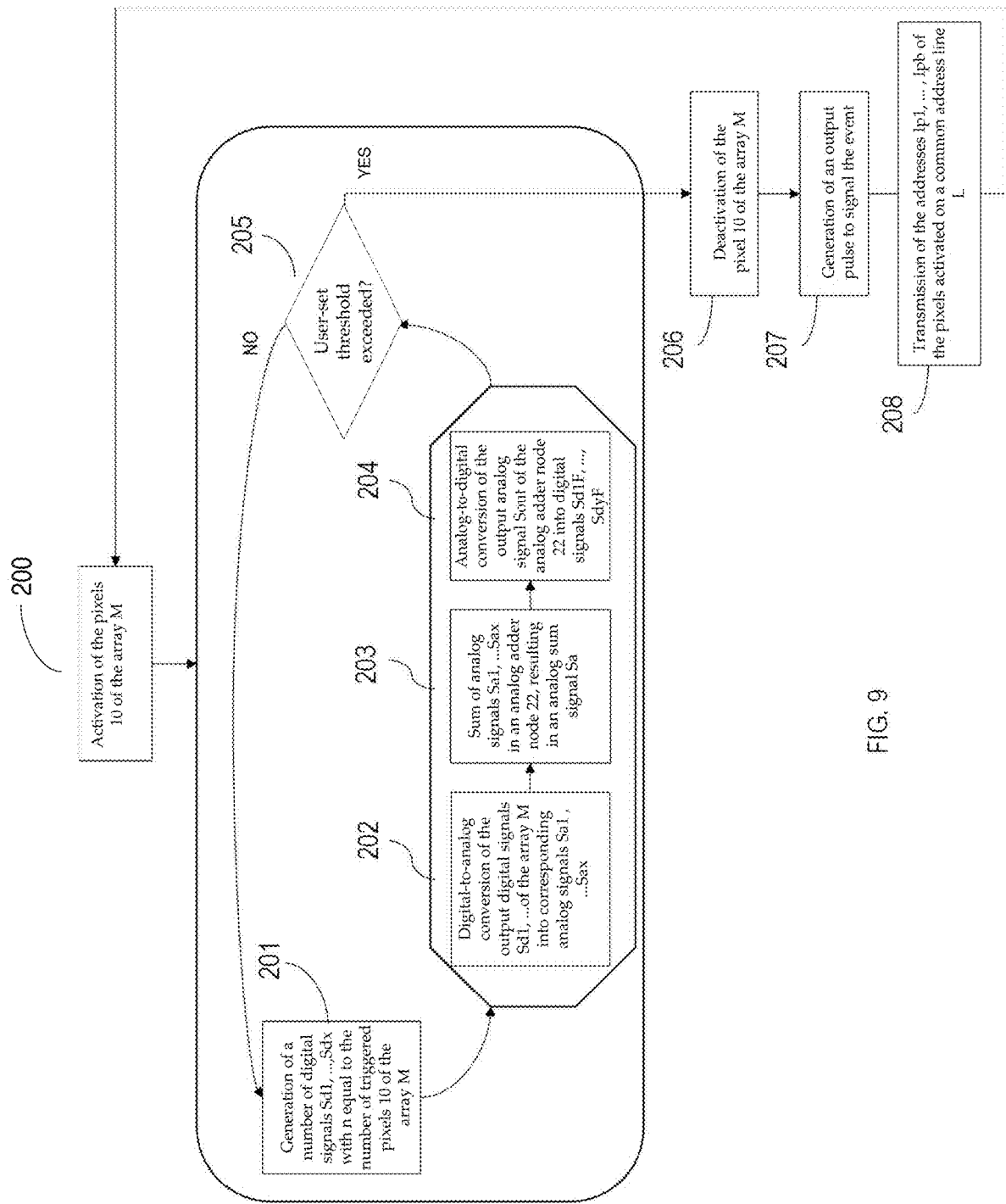
FIG. 9 shows a flow chart of steps of the method for detecting events of photons according to the present invention, in the case of a single pixel array system.

With reference to FIG. 9, a method for detecting photons according to a preferred embodiment of the invention will now be described, conducted using the single array detection system 100 described above and illustrated with reference to FIGS. 3, 4 and 8.

The method starts at step 200, wherein the pixels 10 of the array M are selectively activated, i.e. the pixels are selectively made capable of detecting photons.

Thus, the method comprises a series of steps 201, 202, 203, 204, 205, which are continuously executed each time a pixel is triggered, or may also be carried out in parallel by different pixels, until the pixels are deactivated at a subsequent step 206.

From step 200, the method then proceeds to step 201, during which a number of digital signals $Sd_1, \ldots, Sd_x$ is generated, with n equal to the number of pixels 10 of the array M on which a photon F has hit.

From step 201, the method proceeds:
to step 202, wherein the output digital signals $Sd_1, \ldots, Sd_x$ of the array M enter corresponding digital-to-analog transducers 21 of the event detection electronics 20 of the array M, in which they are converted into corresponding quantized analog signals $Sa_1, \ldots, Sa_x$;
from step 202 to step 203, wherein the quantized output analog signals $Sa_1, \ldots, Sa_x$ of the digital-to-analog transducers 21 enter an analog adder node 22 of the event detection electronics 20 of the array M, in which they are summed, resulting in an analog sum signal Sa, which is also quantized; and
from step 203 to step 204, wherein the output analog signal $S_{out}$ of the analog adder node 22 is converted by the overall analog-to-digital transducer 24, into a number of digital signals $Sd_{1F}, \ldots, Sd_{yF}$, corresponding to the exceeding of respective thresholds (e.g. by 1 photon, ..., n photons).

In particular, the analog-to-digital conversion step of the output analog signal $S_{out}$ of the analog adder node 22 consists in comparing the output analog signal $S_{out}$ with at least a first threshold $TH_1$, for example $TH_1$ corresponding to the triggering of a number N≥1 of pixels 10, and a second threshold $TH_2$, corresponding to the triggering, within the coincidence time window, of a number N≥2 of pixels 10, respectively in the first comparator 25 and the second comparator 26 of the overall analog-to-digital transducer 24 of the event detection electronics 20.

The method proceeds to step 205, wherein it checks whether a threshold set by the user has been exceeded and, if so (step 205, YES), the method proceeds to step 206, wherein the pixels 10 of the array M are deactivated, i.e., they are made insensitive to incident photons, interrupting the parallel execution of steps 201 to 205. Otherwise (step 205, NO), the method continues with the execution of steps 201 to 205.

From step 206, the method proceeds to step 207, wherein, a digital signal of event signaling $Sd_{event}$ is generated, corresponding to the detection, within the time coincidence window, of a number of photons equal to the threshold value set by the user $TH_{tot}$.

From step 207, the method proceeds to step 208, wherein the triggered pixels 10 transmit their own address to a common address line L.

From step 208 the method returns to step 200, wherein pixels 10 of the array M are all activated again.

Figure 10:
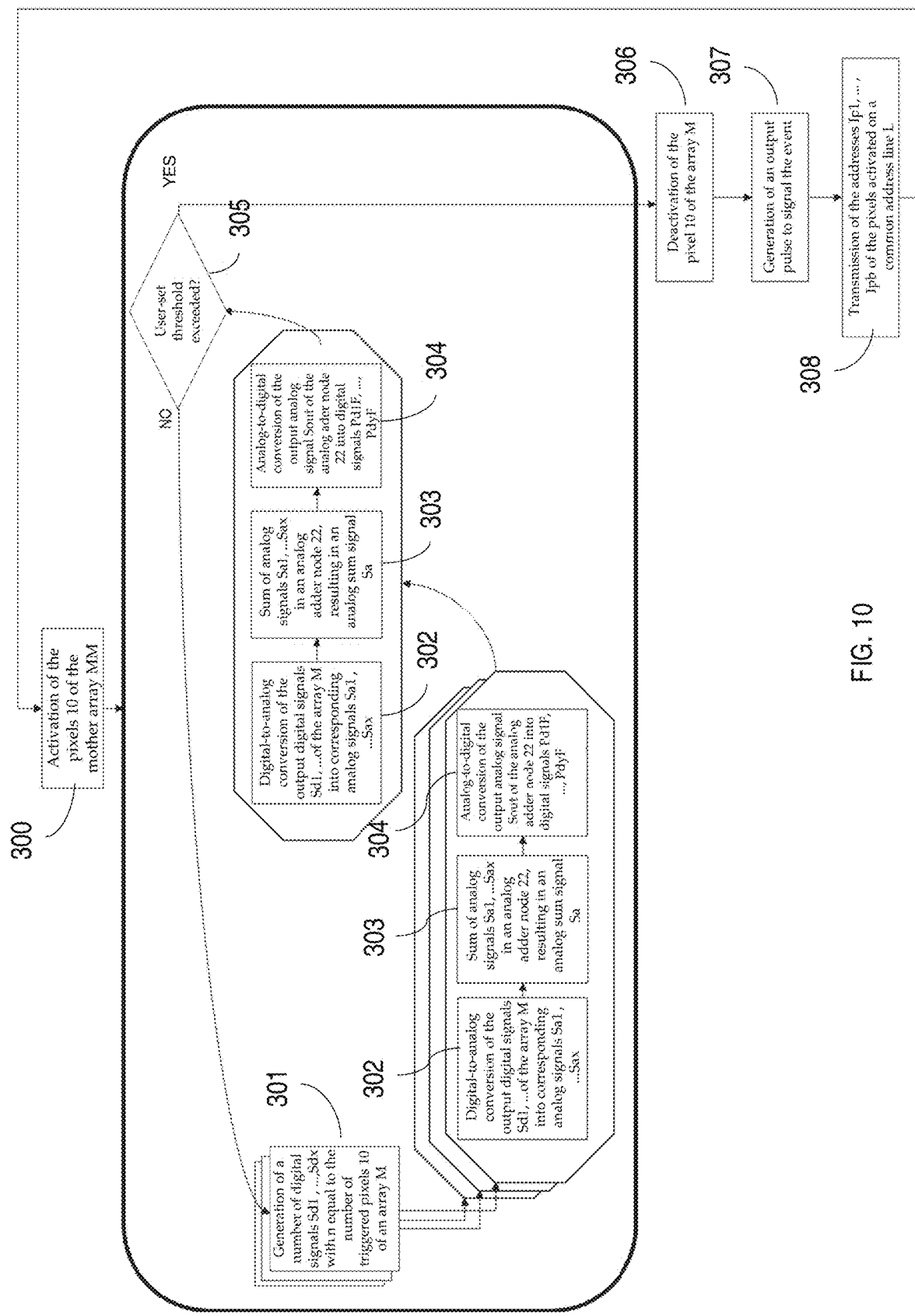
FIG. 10 shows a flow chart of steps of the method for detecting events of photons according to the present invention, in the case of a system with a modular array structure.

With reference to FIG. 10, a method for detecting photons according to an alternative embodiment of the invention will now be described, conducted using the detection system 100 in its modular and scalable version, described above and illustrated with reference to FIGS. 5 to 8.

The method starts in step 300, where pixels 10 of the mother array MM are selectively activated.

The method provides, therefore, for each array M into which the mother array MM is divided (each array is indicated in FIG. 10 by the juxtaposition of identical, ennuplicated blocks), and proceeding in cascade until the completion of the mother array MM, for a series of steps 301, 302, 303, 304, 305, which are continuously executed each time a pixel is triggered, and may also be carried out in parallel by different pixels, until the pixels are deactivated at a subsequent step 306.

From step 300, the method then proceeds to step 301, during which a number of digital signals $Sd_1, \ldots Sd_x$ is generated, with n equal to the number of SPAD 12 of the array M on which a photon F has hit, resulting in the triggering of the respective pixel 10.

From step 301, the method proceeds:
to step 302, wherein the output digital signals $Sd_1, \ldots, Sd_x$ of the array M enter in corresponding digital-to-analog transducers 21 of the event detection electronics 20 of the array M, in which they are converted into corresponding quantized analog signals $Sa_1, \ldots Sa_x$;
from step 302 to step 303, wherein the quantized output analog signals $Sa_1, \ldots, Sa_x$ of the digital-to-analog transducers 21 enter an analog adder node 22 of the event detection electronics 20 of the array M, in which they are summed, resulting in an analog sum signal Sa, which is also quantized; and
from step 303 to step 304, wherein the output analog signal $S_{out}$ of the analog adder node 22 is converted by the overall analog-to-digital transducer 24, into a number of digital signals $Sd_{1F}, \ldots, Sd_{yF}$, corresponding to the exceeding of respective thresholds.

In particular, the analog-to-digital conversion step of the output analog signal $S_{out}$ of the analog adder node 22 consists in comparing the output analog signal $S_{out}$ with at least a first threshold $TH_1$, for example $TH_1$ corresponding to the triggering of a number $N \geq 1$ of pixels 10, and a second threshold $TH_2$, corresponding to the triggering, within the coincidence time window, of a number $N \geq 2$ of pixels 10, respectively in the first comparator 25 and the second comparator 26 of the overall analog-to-digital transducer 24 of the event detection electronics 20.

The method proceeds to step 305, wherein it is checked whether a threshold set by the user has been exceeded and, if so (step 305, YES), the method proceeds to step 306, wherein the pixels 10 of the mother array MM are deactivated, interrupting parallel execution of steps 301 to 305. Otherwise (step 305, NO), it is continued with the execution of steps 301 to 305.

From step 306, the method proceeds to step 307, wherein a digital signal of event signaling $Sd_{event}$ is generated, corresponding to the detection, within the time coincidence window, of a number of photons equal to the threshold value set by the user $TH_{tot}$.

From step 307, the method proceeds to step 308, wherein the triggered pixels 10 transmit their own address to a common address line L.

From step 308 the method returns to step 300, wherein the pixels 10 of the mother array MM are again activated.

From the above description, it is clear that the system and method for detecting photons described above can achieve the proposed goals.

It is therefore obvious to a person skilled in the art that it is possible to make changes and variations to the solution described with reference to the figures without exceeding the scope of protection of the present invention as defined by the appended claims.

The invention claimed is:

1. A system for detecting events of photons comprising: at least one array of pixels, each pixel comprising a photodetector and a front-end electronics, which outputs a digital signal, the system further comprising at least one event detection electronics including:
a plurality of digital-to-analog transductors, one for each pixel of the array, each digital-to-analog transductor configured to convert the digital signal coming from the respective pixel in a corresponding analog signal, which is quantized in amplitude and duration;
an analog adder node, to which the plurality of digital-to-analog transductors is operatively connected, the analog adder node being configured to sum the quantized analog signals coming from the digital-to-analog transductors, thereby obtaining a sum analog signal; and
an overall analog-to-digital transductor comprising:
at least one first comparator and a second comparator, which are operatively connected to the analog adder node,
wherein the first comparator is configured to compare an output signal of the analog adder node with a first threshold corresponding to the triggering of a number of pixels in the array, within a time coincidence window, due to the detection of a number of photons greater than or equal to a first predetermined value, wherein the triggering comprising array pixels detecting a photon, and
wherein the second comparator is configured to compare the output signal of the analog adder node with a second threshold corresponding to the triggering of a number of pixels in the array, within a time coincidence window, due to the detection of a number of photons greater than or equal to a second predetermined value, wherein the triggering comprising array pixels detection a photon, and
wherein the first comparator and the second comparator are configured to output a digital signal if the output signal of the analog adder node exceeds, respectively, the first threshold or the second threshold, thereby allowing event detection, within the time coincidence window, with a number of photons incident on the array greater than or equal to the first or second predetermined value.

2. The system according to claim 1, wherein the first threshold corresponds to the triggering of a number of pixels greater than or equal to one and the second threshold corresponds to the triggering of a number of pixels greater than or equal to two.

3. The system according to claim 1, further comprising an output block, configured to generate a digital event signal upon reaching a threshold of time coincidence photons set by a user.

4. The system according to claim 3, wherein each pixel of the array comprises an event-driven read-out electronics, configured to transmit on a common address line, addresses of the triggered pixels upon generation of the event digital signal.

5. The system according to claim 4, wherein the event-driven read-out electronics of each pixel comprises a pixel state sampling block, an address writing block and a block for monitoring the status of the address line, all blocks being in communication with an open-drain serial port with global pull-up resistor.

6. The system according to claim 4, wherein a number of addresses is transmitted on the common address line, which is equal to the number of pixels triggered within the time window, increased by one unit, to verify the triggering of only n and no more than n pixels.

7. The system according to claim 3, comprising a mother array divided into arrays, wherein the event detection electronics of the arrays are connected to each other in seamless cascade, wherein the last event detection electronics of the cascade is connected to the output block.

8. The system according to claim 7, wherein the cascade connection of the event detection electronics of the arrays follows a route having a H-tree fractal recursive branching.

9. The system according to claim 1, wherein the photodetector of each pixel is a SPAD.

10. A method for detecting photon events, comprising the following steps, which are carried out in parallel:
generating at least one digital signal upon the impact of a photon on one or more pixels of at least one pixel array;
converting the digital signal coming from a respective triggered pixel in a corresponding analog signal, which is quantized in amplitude and duration;
summing the quantized analog signals in an analog adder node, thereby obtaining an analog sum signal;
converting an output signal of the analog adder node into at least two digital signals when the analog signal exceeds two threshold values, respectively;
wherein the analog-to-digital conversion step comprises at least the steps of:

comparing the output signal of the analog adder node with a first threshold corresponding to the triggering of a number of pixels in the array, within a time coincidence window, due to the detection of a number of photons greater than or equal to a first predetermined value, wherein the triggering comprising array pixels detecting a photon;

comparing the output signal of the analog adder node with a second threshold corresponding to the triggering of a number of pixels in the array, within a time coincidence window, due to the detection of a number of photons greater than or equal to a second predetermined value, wherein the triggering comprising array pixels detecting a photon; and generating a digital signal when the output signal of the analog adder node exceeds, respectively, the first threshold or the second threshold, thereby allowing event detection, within the time coincidence window, with a number of photons incident on the array greater than or equal to the first or second predetermined value.

11. The method according to claim 10, wherein the first threshold corresponds to the triggering of a number of pixels greater than or equal to one and the second threshold correspond to the triggering of a number of pixels greater than or equal to two.

12. The method according to claim 10, further comprising a preliminary step of selectively activating pixels of the array to make them sensitive to incident photons, the method further comprising a step of checking the exceeding of a threshold set by a user and when the threshold has not been exceeded, continuing to carry out the following steps of:
 generating at least one digital signal following the impact of a photon on one or more pixels of at least one pixel array;
 converting the digital signal coming from the respective pixel in a corresponding analog signal, which is quantized in amplitude and duration;
 summing the analog signals in an analog adder node, thereby obtaining an analog sum signal; and
 converting an output signal of the analog adder node in at least two digital signals;
otherwise, deactivating pixels of the array.

13. The method according to claim 10, further comprising a step of generating a digital event signal, upon reaching a time coincidence threshold of photons, set by a user.

14. The method according to claim 13, further comprising a step of transmitting, on a common address line, the addresses of the triggered pixels, upon generation of the digital event signal.

15. The method according to claim 10, further comprising repeating the steps of:
 generating at least one digital signal upon the impact of a photon on one or more pixels of at least one pixel array;
 converting the digital signal coming from the respective triggered pixel into a corresponding analog signal, which is quantized in amplitude and duration;
 summing the quantized analog signals in an analog adder node, thereby obtaining an analog sum signal; and
 converting an output signal of the analog adder node into at least two digital signals;
for all the arrays into which a mother array is divided,
wherein the at least two output digital signals of the array are transmitted to a subsequent array, until the mother array is completed, according to a seamless cascade configuration; and
wherein the at least two output digital signals of the mother array are transmitted to an output block, which generates a digital event signal upon reaching a threshold of time coincidence photons set by a user.

* * * * *